United States Patent Office 3,067,735
Patented Dec. 11, 1962

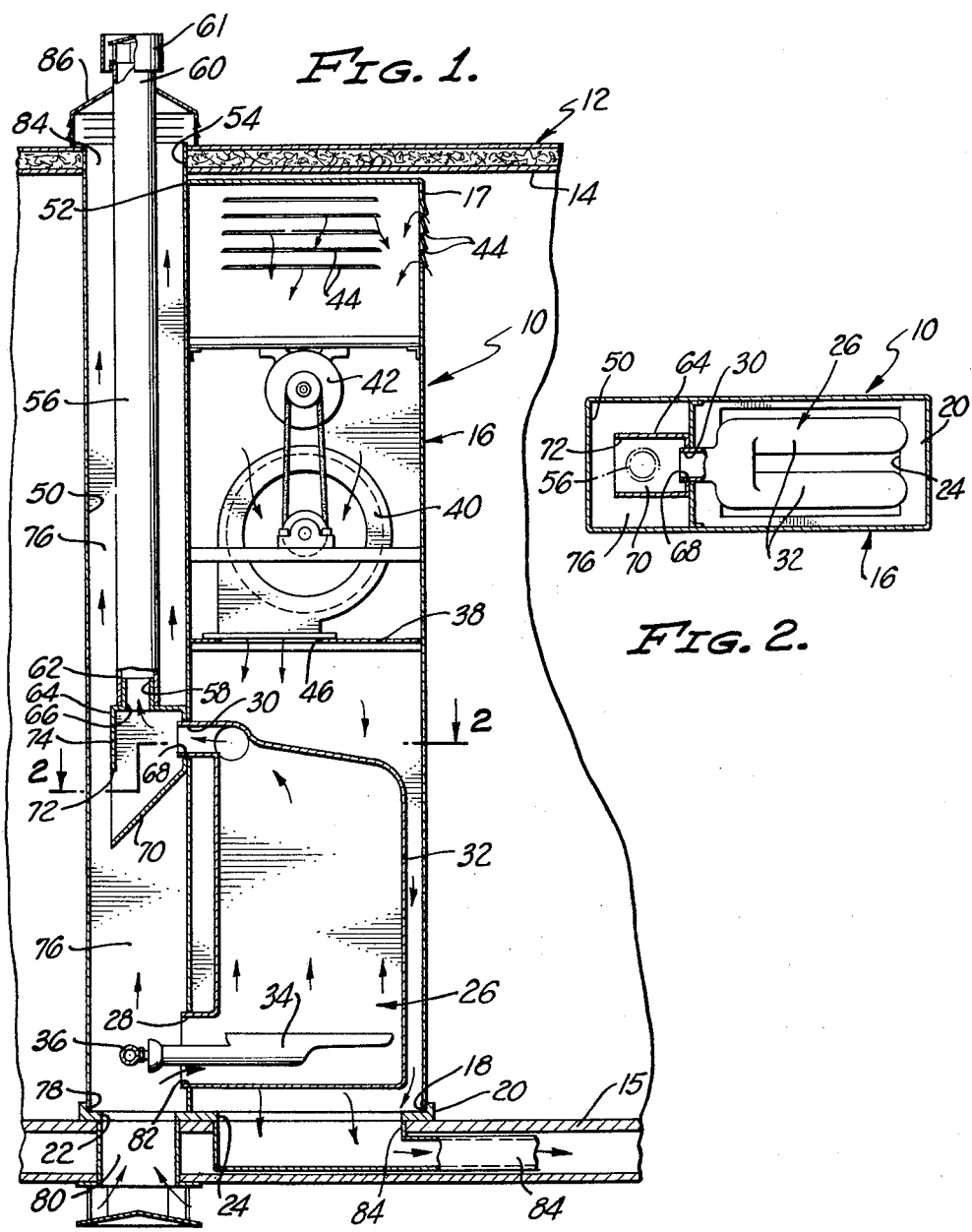

3,067,735
FURNACE SUITABLE FOR TRAILER
INSTALLATION
Richard E. Albert, Arcadia, Calif., assignor to Utility
Appliance Corp., Los Angeles, Calif., a corporation of
California
Filed July 11, 1960, Ser. No. 42,165
6 Claims. (Cl. 126—110)

This invention relates to furnaces for heating rooms by circulating air, and in particular to a furnace to be utilized in connection with a mobile home or trailer coach. Although my furnace is herein described in connection with a mobile home or trailer coach, it is adaptable for many space heating installations, particularly where the room or enclosure is of relatively air-tight construction.

Furnaces have been produced for use in trailer coaches and the like in which the combustion air is drawn from the circulating air within the room being heated, such furnaces usually being isolated in a separate closet. Other trailer furnaces have been installed outside the trailer coach, on the roof, or underneath to provide complete separation between combustion air and circulating air.

Accordingly, it is an object of this invention to provide a furnace of compact design which can be installed inside a trailer coach without the use of a separate closet or the like, and which will draw all combustion air from outside of such trailer coach.

An important object of the invention is to provide a furnace including means to prevent communication between the air circulating within the room being heated and the combustion air. Another object of the invention is to provide a furnace having a ventilating means including a first passage communicating with a combustion chamber and providing an exit for flue gases emanating therefrom and an adjacent second passage provided as an outlet for excess combustion air that bypasses the combustion chamber.

A further object of this invention is to provide a furnace having a ventilating means including a first passage providing an exit for flue gases emanating from a combustion chamber, a draft hood located between the first passage and the combustion chamber having a relief opening therein, and a second passage adjacent the first passage and the draft hood providing an outlet for the excess combustion air that bypasses the combustion chamber.

Still another important object of this invention is to provide a furnace having a draft hood relief opening in the same atmospheric pressure zone as the combustion air supply.

A still further object of the invention is to provide a furnace having a ventilating means including a first or exhaust passage providing an exit for flue gases emanating from a combustion chamber, a draft hood located between the exhaust passage and the combustion chamber having a relief opening therein, and a second or outer air passage adjacent the exhaust passage and draft hood and with which the relief opening communicates providing an outlet for excess combustion air that bypasses the combustion chamber.

Another important object of the invention is to provide a furnace having a ventilating means including a draft hood located between an exhaust passage and a combustion chamber and providing a bottom wall inclined toward a relief opening to deflect downward air drafts from the exhaust passage out such relief opening into an outer air passage which surrounds the exhaust passage and draft hood.

A more specific object of the invention is to provide a furnace for a trailer coach or the like including a housing, a combustion chamber within the housing having means therein for igniting gas or the like, a ventilating means within the housing and adjacent to, and communicating with, the combustion chamber to provide an exit for flue gases emanating therefrom, a combustion air inlet extending externally of the room being heated and communicating with the combustion chamber and the ventilating means, a blower located within the housing for causing air to pass over the surface of the combustion chamber and be heated thereby, an air inlet in said housing adjacent the blower, and a warm air discharge duct adjacent the combustion chamber.

The invention also comprises novel details of construction and novel combinations and arrangements of parts, which will more fully appear in the course of the following description. The drawing and the description disclose a preferred embodiment of the present invention, which is given by way of illustration or example.

FIG. 1 is a vertical cross-sectional view of the invention; and

FIG. 2 is a horizontal cross-sectional view of the invention taken along the arrowed line 2—2 of FIG. 1.

Referring now to the drawing, FIG. 1 exhibits a forced air furnace of the counterflow type designated by the numeral 10. The furnace 10 is installed within a mobile home or trailer coach 12 having a ceiling 14 and a floor 15. Further, the furnace 10 includes a housing 16 providing an upper end 17 and an open bottom end 18. The bottom end 18 of the housing 16 is shown as being secured to a mounting base 20 having adjacent openings, 22 and 24, located therein and being secured to the floor 15 of the trailer coach 12. Located near the bottom end 18 of the housing 16 and mounted therewithin is a combustion chamber 26 having an inlet port 28 adjacent the mounting means 20, an outlet port 30 spaced upwardly therefrom, a heat exchanger 32 located between the inlet port 28 and the outlet port 30, and a gas burner 34 positioned within the heat exchanger 32 and connected to a fuel supply line 36 passing through the inlet port 28.

Spaced upwardly from the combustion chamber 26 and mounted on a transverse platform 38 within the housing 16 is a blower 40 operated by a motor 42. The blower 40 draws air from within the room being heated through air inlets or louvers 44 located adjacent the blower 40 at the upper end 17 of the housing 16, and causes such air to be accelerated downwardly through an opening 46 in the transverse platform 38 and then through and around the heat exchanger 32 and eventually passing from the housing 16 via a warm air discharge duct 48 which communicates with the opening 24 in the mounting means 20 and extends into the trailer floor 15. Alternatively, the air to be heated can be drawn in from outside the coach or room.

A ventilating means such as a duct 50 is located within the housing 16, extending from the mounting base 20 along the entire length of such housing and passing therefrom through a vent outlet 52 at the upper end 17. The ventilating duct 50 then extends through an aperture 54 in the trailer ceiling 14 to the exterior of the trailer coach 12. Further, the ventilating duct 50 is positioned adjacent the combustion chamber 26 and includes a centrally located vent tube 56 defining an exhaust passage 58 with an exhaust outlet end 60 extending externally of the trailer coach 12 with an outlet cap 61 secured thereto and an exhaust inlet end 62 secured to a draft hood 64. The draft hood 64 provides a first aperture 66 communicating with the exhaust inlet end 62 of the passage 58 and a second aperture 68 communicating with the outlet port 30 of the combustion chamber 26. Further, the draft hood 64 provides a bottom wall 70 inclined downwardly and away from the second apertures 68 and toward a draft hood relief opening 72 located in a side wall 74 of the draft hood 64.

The ventilating duct 50 further defines an outer air passage 76 surrounding the exhaust passage 58 and the draft hood 64 and having an opening 78 at the bottom thereof communicating with the opening 22 in the mounting means 20 to provide access to a combustion air inlet 80 extending through the trailer floor 15 from the exterior of the coach 12, a side opening 82 positioned adjacent the mounting means 20 and communicating with the inlet port 28 of the combustion chamber 26, and an open top end 84 located externally of the trailer ceiling 14 and having a vent cap 86 secured thereon. The draft hood relief opening 72 opens into the passage 76 allowing for communication between such air passage and the draft hood 64.

Under normal operating conditions combustion air is admitted to the combustion chamber 26 by passing from the exterior of the trailer coach 12 through the combustion air inlet 80 into the outer air passage 76 of the ventilating duct 50 and through the inlet port 28 of the combustion chamber 26. Excess air that bypasses the combustion chamber 26 flows upwardly along the passage 76 and eventually to the exterior thereof by passing out of the vent cap 86.

In the event heavy gusts of wind create a down draft in the exhaust passage 58, such a draft of external air would be deflected by the inclined bottom wall 70 of the draft hood 64 out the relief opening 72 and into the outer air passage 76 to be carried upwardly and eventually to the exterior of the trailer coach 12.

The portion of the combustion air that passes into the combustion chamber 26 is converted into flue gases which flow upwardly into the heat exchanger 32, through the outlet port 30, into the draft hood 64, and into the exhaust passage 58 leading to the exterior of the trailer coach 12. The air entering the housing 16 through the air inlets or louvers 44 is accelerated in a downward direction by the blower 40 so as to be heated in passing over the surface of the heat exchanger 32 and to eventually pass from the housing 16 via the warm air discharge duct 48. Alternatively, the heated air may be discharged directly into the space being heated. All the while this space heating air is prevented from communicating with and mixing with the flue gases emanating from the combustion chamber 26 or the combustion air being drawn from the exterior of the space being heated.

Although a counterflow furnace with the blower moving air past the heat exchanger in a downward direction has been employed in the instant description, the structure is equally applicable to a parallel flow furnace where the blower directs the air upward past the heat exchanger and to gravity flow furnaces which do not employ blowers or the like. Further, it will be understood that various modifications, minor changes and substitutions may be incorporated in such embodiment without departing from the spirit of the invention as defined by the claims which follow.

I claim as my invention:

1. In a mobile home or trailer coach having a floor and a ceiling, a forced air furnace in said trailer coach comprising a housing mounted between said floor and ceiling; a combustion chamber positioned within said housing having burner means located therewithin and providing an inlet port adjacent said trailer floor and an outlet port spaced upwardly therefrom; a ventilating means adjacent said combustion chamber and including an exhaust passage providing an exit for flue gases emanating therefrom, a draft hood providing a first aperture communicating with said exhaust passage, a second aperture communicating with the outlet port of said combustion chamber, and a bottom wall inclined downwardly and away from said second aperture and toward a draft hood relief opening located in a side wall of said draft hood, and means forming an outer air passage surrounding said exhaust passage and draft hood and communicating with said inlet port to provide external combustion air for said burner means and with which passage said draft hood relief opening communicates; a combustion air inlet extending through said trailer floor from the exterior thereof and communicating with said outer air passage; a blower located within said housing for causing circulating air to pass over the surface of said combustion chamber and be heated thereby; an air inlet port in said housing positioned adjacent said blower; and a warm air discharge duct adjacent said combustion chamber providing a portion of the flow path for said circulating air.

2. In a room to be heated, the room having a floor and a ceiling, the combination of: a heat exchanger having a burner therein; conduit means for directing air to be heated past said heat exchanger; a vertically disposed ventilating means mounted between said floor and ceiling and having an air inlet port disposed below said floor and an air outlet port disposed above said ceiling; conduit means for directing combustion air from said ventilating means into said heat exchanger; a flue gas vent having an inlet coupled to said heat exchanger and an outlet adjacent the outlet of said ventilating means and above said ceiling; and a draft hood mounted at the lower end of said flue gas vent below the inlet thereof, said draft hood being surrounded by and having a relief opening discharging into said ventilating means.

3. In a room to be heated, the room having a floor and a ceiling, the combination of: a heat exchanger having a burner therein; conduit means for directing air to be heated past said heat exchanger; a vertically disposed ventilating means mounted between said floor and ceiling and having an air inlet port disposed below said floor and an air outlet port disposed above said ceiling; conduit means for directing combustion air from said ventilating means into said heat exchanger adjacent the lower end thereof; a flue gas vent positioned within said ventilating means and having an inlet coupled to said heat exchanger adjacent the upper end thereof and an outlet adjacent the outlet of said ventilating means and above said ceiling; and a draft hood mounted at the lower end of said flue gas vent below the inlet thereof, said draft hood being surrounded by and having a relief opening discharging into said ventilating means.

4. In a room having a top, a bottom, and side walls, a forced air furnace in said room comprising a housing mounted between said room top and bottom; a combustion chamber positioned within said housing; a ventilating means in said housing adjacent said combustion chamber and including means forming an exhaust passage communicating with said combustion chamber to provide an exit for flue gases emanating therefrom and an air passage surrounding said exhaust passage and communicating with said exhaust passage within said housing; a combustion air inlet extending through the bottom, and externally, of said room and communicating with said combustion chamber and said outer air passage of the ventilating means; a blower located within said housing for causing circulating air to pass over the surface of said combustion chamber and be heated thereby; an air inlet part in said housing positioned adjacent said blower; and a warm air discharge duct adjacent said combustion chamber providing a portion of a flow path for circulating air through said inlet port, over said combustion chamber, and out said discharge duct.

5. In a room to be heated, said room having a floor and a ceiling, the combination of: a heat exchanger having a burner therein; conduit means for directing air to be heated past said heat exchanger; a vertically disposed ventilating means mounted in said room between said floor and ceiling and having a combustion air inlet positioned below said floor and an outlet positioned above said ceiling; conduit means for directing combustion air from said ventilating means into said heat exchanger adjacent the lower end thereof; a flue gas vent positioned within and parallel to the longitudinal vertical axis of said ventilating means and having an inlet coupled to said heat exchanger adjacent the upper end thereof and an outlet positioned above said ceiling; and a draft hood mounted within said ventilating means at the lower end of said flue gas vent below the inlet thereof, said draft hood having an aperture communicating with the outlet port of said heat exchanger and a bottom wall inclined downwardly and away from said aperture and toward a draft hood relief opening in a side wall of said draft hood and communicating with said ventilating means.

6. In a room to be heated, said room having a floor and a ceiling, the combination of: a heat exchanger having a burner therein; conduit means for directing air to be heated past said heat exchanger; a warm air discharge duct adjacent said heat exchanger providing a portion of the flow path for circulating air from said conduit means to the room to be heated; a flue gas vent having an inlet coupled to said heat exchanger adjacent the upper end thereof and an outlet positioned above the room to be heated; a draft hood mounted at the lower end of said flue gas vent below the inlet thereof, said draft hood having a relief opening for discharging a downdraft therefrom; a vertically disposed ventilating means mounted in said room between said floor and ceiling and axially positioned about said flue gas vent and extending from the exterior of the bottom of the room to be heated to the exterior of the top of the room to be heated, said ventilating means surrounding said draft hood and relief opening and including a combustion air inlet positioned at the bottom thereof, below said room and adjacent said warm air discharge duct and said burner within the heat exchanger, and an outlet positioned at the top thereof, above the room to be heated and adjacent the outlet of said flue gas vent; and a conduit means for directing combustion air from said ventilating means into said heat exchanger adjacent the lower end thereof.

References Cited in the file of this patent

UNITED STATES PATENTS

| | | |
|---|---|---|
| 252,752 | Fitzgerald | Jan. 24, 1882 |
| 2,818,060 | Field | Dec. 31, 1957 |
| 2,880,717 | Tilmann | Apr. 7, 1959 |
| 3,017,878 | Cayot | Jan. 23, 1962 |